United States Patent [19]

Woo

[11] Patent Number: 5,143,632

[45] Date of Patent: Sep. 1, 1992

[54] POLYSILOXANE POLYMER HAVING PENDANT AROMATIC GROUPS USEFUL IN ENHANCED OIL RECOVERY USING CARBON DIOXIDE FLOODING

[75] Inventor: Gar Lok Woo, Tiburon, Calif.

[73] Assignee: Chevron Research and Technology Co., San Francisco, Calif.

[21] Appl. No.: 669,156

[22] Filed: Mar. 14, 1991

[51] Int. Cl.$^5$ ............................................. E21B 43/22
[52] U.S. Cl. .............................. 252/8.554; 252/8.551; 166/268; 166/273; 166/274; 528/15
[58] Field of Search ...................... 166/268, 274, 273; 252/8.554, 8.551; 528/15, 31, 43, 28

[56] References Cited

U.S. PATENT DOCUMENTS

| | | | |
|---|---|---|---|
| 2,970,150 | 1/1961 | Bailey | 528/28 |
| 4,230,815 | 10/1980 | Itoh et al. | 526/335 |
| 4,427,574 | 1/1984 | Pierpoint | 528/15 X |
| 4,609,043 | 9/1986 | Cullick | 166/268 |
| 4,701,488 | 10/1987 | Williams | 524/266 |
| 4,709,001 | 11/1987 | Maxson | 528/15 |
| 4,913,235 | 4/1990 | Harris et al. | 166/273 |
| 4,931,485 | 6/1990 | Inoue et al. | 521/154 |
| 4,945,989 | 8/1990 | Irani et al. | 166/273 X |
| 4,945,990 | 8/1990 | Irani et al. | 166/273 X |
| 4,954,401 | 9/1990 | Revis | 528/15 X |
| 5,022,467 | 6/1991 | Irani et al. | 166/273 |

OTHER PUBLICATIONS

"Silicon Compounds", PetrarchSystems Silanes & Silicones, 1988-1988.

John L. Speier, "Advances in Organometiallic Chemistry", Catalysis and Organic Syntheses, vol. 17.

Allen Noshay & James E. McGrath, "Block Copolymers Overview and Critical Survey", pp. 278-279, Academic Press, Inc.

"Refractors to Silk", Encyclopedia of Chemical Technology, Third Edition, vol. 20.

*Primary Examiner*—Robert L. Stoll
*Assistant Examiner*—C. Sayala
*Attorney, Agent, or Firm*—E. J. Keeling; E. A. Schaal

[57] ABSTRACT

A polysiloxane polymer having pendant aromatic groups that is useful in increasing the viscosity of carbon dioxide. That polymer can be formed by reacting a polysiloxane containing at least one olefinic group with a phenyldialkylsilane. That polymer can be used in a method for recovering oil from an underground oil-bearing earth formation penetrated by an injection well and a producing well, in which method carbon dioxide is injected into the formation to displace oil towards the producing well from which oil is produced to the surface. The viscosity of the carbon dioxide injected into the formatin is increased at least three-fold by the presence of a sufficient amount of the polymer and a sufficient amount of a cosolvent to form a solution of the polymer in the carbon dioxide.

9 Claims, No Drawings

POLYSILOXANE POLYMER HAVING PENDANT AROMATIC GROUPS USEFUL IN ENHANCED OIL RECOVERY USING CARBON DIOXIDE FLOODING

The present invention relates to a polysiloxane polymer having pendant aromatic groups; to new compositions of matter comprising carbon dioxide and a viscosifying amount of a mixture of a cosolvent and that polymer; and to a method of recovering oil from underground subterranean formations using those new compositions of matter.

BACKGROUND OF THE INVENTION

In newly discovered oil fields, oil usually will be recovered by the oil flowing from a producing well under the naturally occurring pressure of the fluids present in the porous reservoir rocks. That naturally occurring pressure decreases as the fluids are removed. This phase of production, called primary production, recovers perhaps 5% to 20% of the oil present in the formation.

Secondary recovery methods (e.g., waterflooding) are used to recover more of the oil. In these methods, a fluid is injected into the reservoir to drive additional oil out of the rocks. Waterflooding has limitations. Since the water is immersible with oil, as the water displaces the oil the oil remaining in the reservoir reaches a limiting value known as "the residual oil saturation" and the oil stops flowing. There is a strong capillary action which tends to hold the oil in the interstices of the rocks. The amount of oil recovered by secondary techniques is usually from about 5% to 30% of the oil initially present.

In recent years, more attention has been directed to enhanced oil recovery or tertiary recovery methods. These tertiary recovery methods are used to recover the residual oil by overcoming the capillary forces which trap the oil during waterflooding. For example, it has been suggested to add surfactants to the flood to decrease the interfacial tension and thus allow oil droplets to move to producing wells.

Secondary or tertiary recovery of oil is also possible by the miscible fluid displacement process. A number of carbon dioxide floods have been tried in the United States. The carbon dioxide tends to dissolve in the oil, which swells with a consequent decrease in viscosity and improvement in the flow to producing wells. The carbon dioxide also extracts light hydrocarbons from the oil and this mixture of carbon dioxide and light hydrocarbons can, in some cases, reach a composition that will miscibly displace the oil.

This carbon dioxide-rich phase characteristically has a lower viscosity than the oil and tends to finger through the formation. Early carbon dioxide breakthrough is undesirable since reservoir sweep is reduced and expensive separation procedures are required to separate and recycle the carbon dioxide.

In U.S. Pat. No. 4,913,235, Harris et al. report a means of increasing viscosity for the carbon dioxide thirty-fold or more by using cosolvents, along with certain defined polymers having a solubility parameter of close to 6.85 (cal/cc)$^{\frac{1}{2}}$ [14.0 J$^{\frac{1}{2}}$/cm$^{3/2}$] and having electron donor groups such as ether, silyl ether, and tertiary amine. Those defined polymers include polysiloxanes and polyvinylethers.

SUMMARY OF THE INVENTION

The present invention is based on the discovery that a polysiloxane polymer having pendant aromatic groups is useful with a cosolvent in increasing the viscosity of carbon dioxide. Preferably, the pendant aromatic groups are pendant phenyldialkylsilyl groups, such as phenyldimethylsilyl groups.

Polysiloxane polymers having pendant aromatic groups can be formed by reacting together a phenyldialkyl silane and a polysiloxane that has at least one olefinic group, but preferably more than one olefinic group on the polymer backbone. Preferably, the polymer is formed in the presence of platinum-containing catalyst, such as chloroplatinic acid or a platinum-divinyltetramethyldisiloxane complex.

In one embodiment of the present invention, the polymer is used in a method for recovering oil from an underground oil-bearing earth formation penetrated by an injection well and a producing well. In that method, carbon dioxide is injected into the formation to displace the oil towards the producing well. The viscosity of that carbon dioxide is increased at least three-fold by the presence of a sufficient amount of the polymer and a sufficient amount of a cosolvent to form a solution of the polymer in the carbon dioxide. It is possible that, for some polymers, under some conditions of pressure and temperature, no cosolvent will be needed. Usually, the amount of cosolvent needed increases with the molecular weight of the polymer. Furthermore, the cosolvent requirement is affected by the field conditions, such as temperature and pressure.

Preferably, the cosolvent is an aromatic hydrocarbon. More preferably, the cosolvent is toluene.

Preferably, the carbon dioxide solution comprises from 60 to 99.9 weight percent carbon dioxide, from 0.05 to 10 weight percent polymer, and from 0.05 to 40 weight percent cosolvent. The carbon dioxide solution can be prepared by forming a solution of the polymer and the cosolvent and then mixing carbon dioxide with the polymer-cosolvent solution.

DESCRIPTION OF THE PREFERRED EMBODIMENTS

In its broadest aspect, the present invention is based upon the discovery of a polysiloxane polymer having pendant aromatic groups that is soluble in carbon dioxide in the presence of a cosolvent.

In one preferred embodiment of this invention, this polymer is used in a method for recovering oil from an underground oil-bearing earth formation penetrated by an injection well and a producing well. In that method, carbon dioxide is injected into the formation to displace the oil towards the producing well. The viscosity of the carbon dioxide that is injected into the formation is increased at least three-fold by the presence of a sufficient amount of a polysiloxane polymer having pendant aromatic groups and a sufficient amount of a cosolvent to form a solution of the polymer in the carbon dioxide. It is possible that, for some polymers, under some conditions of pressure and temperature, no cosolvent will be needed.

POLYMER

The polymer of the present invention is a polysiloxane polymer having pendant aromatic groups. By "polysiloxane polymer having pendant aromatic groups," we mean linear polydialkylsiloxanes, which have aromatic groups linked to some of the alkyl groups in the polymer, for example by silicone bridges. Preferably, the pendant aromatic groups are phenyldimethylsilyl groups and the alkyl groups have one to ten carbons.

A polysiloxane polymer having pendant aromatic groups can be formed by reacting a polysiloxane containing at least one olefinic group with a phenyldialkyl silane in the presence of platinum-containing catalyst. For instance, in one set of runs, $Me_3SiO[(SiMe_2O)_{80}$-$(SiCH=CH_2MeO)_{20}]_xSiMe_3$ (300,000 centistokes) was reacted with phenyldimethylsilane.

TABLE A

| | Polysiloxane | | Silane | | SiH: | | | |
|---|---|---|---|---|---|---|---|---|
| Run | g | $SiCH=CH_2$, Mole | g | SiH, Mole | $SiCH=CH_2$ Mole Ratio | Catalyst Type[2] | µl | Toluene g |
| I | 8.0 | 0.0184 | 2.78 | 0.0204 | 1.1 | $H_2PtCl_6$ | 10 | 39.9 |
| II | 16.0 | 0.0368 | 0.54 | 0.0397 | 1.1 | $H_2PtCl_6$ | 3 | 8.2 |
| III | 12.2 | 0.0280 | 3.00 | 0.0221 | 0.8 | PC072 | 5 | 17.2 |
| IV | 8.0 | 0.0184 | 2.73 | 0.0201 | 1.1 | $H_2PtCl_6$ | 15 | 43.2 |
| V | 8.0 | 0.0184 | 2.73 | 0.0201 | 1.1 | PC072 | 12 | 43.2 |
| VI | 8.0 | 0.0184 | 2.75 | 0.0202 | 1.1 | $H_2PtCl_6$ | 20 | 40.1 |
| VII | 8.0 | 0.0184 | 2.91 | 0.0214 | 1.2 | $H_2PtCl_6$ | 20 | 16.3 |
| VIII | 32.0 | 0.0736 | 10.80 | 0.0794 | 1.1 | $H_2PtCl_6$ | 50 | 172.3 |
| IX | 32.0 | 0.0736 | 10.80 | 0.0794 | 1.1 | PC072 | 80[1] | 171.2 |

[1] in two portions.
[2] $H_2PtCl_6$ is 0.1 M in isopropyl alcohol; PC072 is platinum divinyltetramethyldisiloxane complex in xylene (neutral, 2-3% Pt). PC072 is a product identification number of Petrarch Systems.

The viscosity of carbon dioxide at 2500 psi and 54° C. was increased about six fold by using 2% polymer of run VIII and 30% toluene.

TABLE B

| | Reaction Conditions | | | Viscosity of Product[1] in Toluene, cST at 25° C. | | |
|---|---|---|---|---|---|---|
| Run | Temp. °C. | Time Hr. | Reactant Conc. Wt % | 2 g Prod/100 ml | 3 g Prod/100 ml | Comments |
| I | RT | 0.0 | 21.3 | 1.307 | | |
| | 72-76 | 2.0 | | 2.360 | 4.100 | Reacted |
| II | 70-92 | 2.2 | 20.7 | | 4.130 | Reacted |
| III | RT | 16.0 | 46.9 | | | No change |
| | 85 | 0.8 | | | | gel |
| IV | RT | .0 | 19.9 | 1.321 | | |
| | 70 | 2.3 | | 2.671 | | |
| | 70 | 5.0 | | 3.066 | | |
| V | 70 | 2.3 | 19.9 | 2.924 | | |
| | 70 | 5.0 | | 3.339 | | |
| VI | 100-105 | 5.0 | 21.1 | 27.59 | | Some gel |
| VII | 90-105 | 4.0 | 40.1 | | | Gel |
| VIII | 80-87 | 6.5 | 19.6 | 3.668 | 6.261 | *4.946 cST at 2.5 g/100 ml |
| IX | 80-87 | 13.0 | 19.7 | 4.736 | 7.632 | *6.302 cST at 2.5 g/100 ml |

*1% $Ph_3P$ used to stop reaction
[1] Assumed complete reaction, product not isolated

CARBON DIOXIDE

The carbon dioxide can come from any suitable source, such as those described in "Miscible Displacement" by Fred I. Stalkup, Jr. (Monograph Vol. 8, Henry L. Doherty Series, ISBN NO895203197, Society of Petroleum Engineers, 1983, Chap. 8, sec. 8.4). Substantially pure carbon dioxide is preferred, but water-saturated carbon dioxide is acceptable since water (or brine) is usually present in the formation. Usually, the carbon dioxide contains at least 95% carbon dioxide and preferably at least 98% carbon dioxide, the remainder being usually light hydrocarbons. The amount of impurities in the carbon dioxide which can be tolerated is a function of the type of oil to be displaced and the type of displacement operation.

COSOLVENT

As a class, it would appear that many materials are suitable for use as cosolvents in this invention:
(a) alcohols having from 1 to 8 carbon atoms,
(b) aromatics having a single ring and from 6 to 10 carbon atoms,
(c) ketones having from 3 to 10 carbon atoms,
(d) carboxylic acid esters where the carboxylic acid portion has from 2 to 4 carbon atoms and the ester portion has from 1 to 10 carbon atoms,
(e) hydrocarbons having from 2 to 20 carbon atoms, including refinery streams such as naphthas, kerosene, gas oils, gasolines, etc., and
(f) ethers and glycol ethers having from 2 to 10 carbon atoms.

If hydrocarbons are used, preferably they are aliphatic, naphthenic, or aromatic hydrocarbons having from 3 to 10 carbon atoms. More preferably, the cosolvent is an aromatic hydrocarbon. Most preferably, the cosolvent is toluene.

One technique for obtaining the desired cosolvent on site is to contact the carbon dioxide in a liquid-liquid extraction apparatus with recovered crude or a fraction of such crude for a sufficient time to permit the carbon dioxide to extract enough light hydrocarbons to function as the cosolvent. The desired amount of polymer would then be added to the carbon dioxide-light hydrocarbon extent to form the oil-driving material.

The polymer-cosolvent-carbon dioxide mixture must be compatible with the formation fluids so that the polymer won't precipitate in the formation after injection.

AMOUNTS OF CARBON DIOXIDE, POLYMER, AND COSOLVENT

The new compositions of this invention preferably comprise from 60 to 99.9 weight percent carbon dioxide and a sufficient amount of a mixture of a polymer and a cosolvent to effect at least a three-fold increase in the viscosity of the carbon dioxide. Usually the weight percent polymer in the mixture is from 0.05 to 10 weight percent. The amount of cosolvent is at least sufficient to dissolve the desired amount of polymer in the carbon dioxide. This amount of cosolvent is usually from 0.05 to 40 weight percent of the final mixture.

One method of preparing the viscous carbon dioxide solution is by forming a first solution of the polymer and cosolvent and then mixing carbon dioxide with the polymer-cosolvent solution. The viscous carbon dioxide is displaced through the formation by a drive fluid which is comprised of slugs of viscous carbon dioxide alternated with slugs of a fluid comprising water or reservoir brine.

While the present invention has been described with reference to specific embodiments, this application is intended to cover those various changes and substitutions which may be made by those skilled in the art without departing from the spirit and scope of the appended claims.

What is claimed is:

1. A solution comprising carbon dioxide, a polymer, and a cosolvent, wherein the polymer comprises a polysiloxane polymer having pendant phenyldialkylsilyl groups; and
   wherein the cosolvent is selected from the group consisting of:
   (a) alcohols having from 1 to 8 carbon atoms.
   (b) aromatics having a single ring and from 6 to 10 carbon atoms.
   (c) ketones having from 3 to 10 carbon atoms.
   (d) carboxylic acid esters where the carboxylic acid portion has from 2 to 4 carbon atoms and the ester portion has from 1 to 10 carbon atoms.
   (e) hydrocarbons having from 2 to 20 carbon atoms, and
   (f) ethers and glycol ethers having from 2 to 10 carbon atoms.

2. The solution according to claim 1 wherein the pendant phenyldialkylsilyl groups are pendant phenyldimethylsilyl groups.

3. The solution according to claim 1 wherein the cosolvent is an aromatic hydrocarbon having a single ring and from 6 to 10 carbon atoms.

4. The solution according to claim 3 wherein the cosolvent is toluene.

5. In a method for recovering oil from an underground oil-bearing earth formation penetrated by an injection well and a producing well, in which method carbon dioxide in injected into the formation to displace oil towards the producing well from which the oil is produced to the surface, the improvement comprising injecting into the formation carbon dioxide, the viscosity of which is increased at least three-fold by the presence of a sufficient amount of a polysiloxane polymer having pendant phenyldialkylsilyl groups.

6. The method according to claim 5 wherein the pendant phenyldialkylsilyl groups are pendant phenyldimethylsilyl groups.

7. The method according to claim 5 wherein a sufficient amount of a cosolvent is present in the carbon dioxide to form a solution of the polymer in the carbon dioxide: and
   wherein the cosolvent is selected from the group consisting of:
   (a) alcohols having from 1 to 8 carbon atoms.
   (b) aromatics having a single ring and from 6 to 10 carbon atoms.
   (c) ketones having from 3 to 10 carbon atoms.
   (d) carboxylic acid esters where the carboxylic acid portion has from 2 to 4 carbon atoms and the ester portion has from 1 to 10 carbon atoms.
   (e) hydrocarbons having from 2 to 20 carbon atoms, and
   (f) ethers and glycol ethers having from 2 to 10 carbon atoms.

8. The method according to claim 5 wherein the carbon dioxide solution comprises from 60 to 99.9 weight percent carbon dioxide, from 0.05 to 10 weight percent polymer, and from 0.05 to 40 weight percent cosolvent.

9. The method according to claim 5 in which the carbon dioxide solution is prepared by forming a first solution of the polymer and the cosolvent and then mixing carbon dioxide with the first solution.

* * * * *